(12) United States Patent
Ahn

(10) Patent No.: US 7,088,338 B2
(45) Date of Patent: Aug. 8, 2006

(54) OPTICAL MOUSE AND METHOD FOR PREVENTING AN ERRONEOUS OPERATION THEREOF

(75) Inventor: Jung Hong Ahn, Yongin (KR)

(73) Assignee: Atlab Inc. (KR)

( * ) Notice: Subject to any disclaimer, the term of this patent is extended or adjusted under 35 U.S.C. 154(b) by 404 days.

(21) Appl. No.: 10/628,983

(22) Filed: Jul. 28, 2003

(65) Prior Publication Data
US 2004/0021637 A1    Feb. 5, 2004

(30) Foreign Application Priority Data
Jul. 30, 2002    (KR)    ............ 10-2002-0045093

(51) Int. Cl.
*G09G 5/08*    (2006.01)
(52) U.S. Cl. ................. 345/166; 250/221
(58) Field of Classification Search ......... 345/156, 345/157, 163–166; 250/221
See application file for complete search history.

(56) References Cited

U.S. PATENT DOCUMENTS 5,994,710 A * 11/1999 Knee et al. ............ 250/557
6,741,335 B1 * 5/2004 Kinrot et al. ............ 356/28

* cited by examiner

*Primary Examiner*—Dennis-Doon Chow
(74) *Attorney, Agent, or Firm*—Cantor Colburn LLP

(57) ABSTRACT

Disclosed is an optical mouse comprising an image sensor, consisted of a plurality of pixels, for outputting signals accumulated in a given time as a pixel unit, an A/D converter, an image data calculating a moving value of the optical mouse, a system controller for controlling a data flow with an external system, an average value calculator calculating an average value, and a pick-up state discriminator for generating a pick-up state signal. In addition, the optical mouse further comprises a fluorescent lamp state discriminator for discriminating whether the optical mouse is in a fluorescent lamp state and generating a fluorescent lamp state signal.

5 Claims, 5 Drawing Sheets

FIG. 1
(CONVENTIONAL ART)
FIG. 2
(CONVENTIONAL ART)
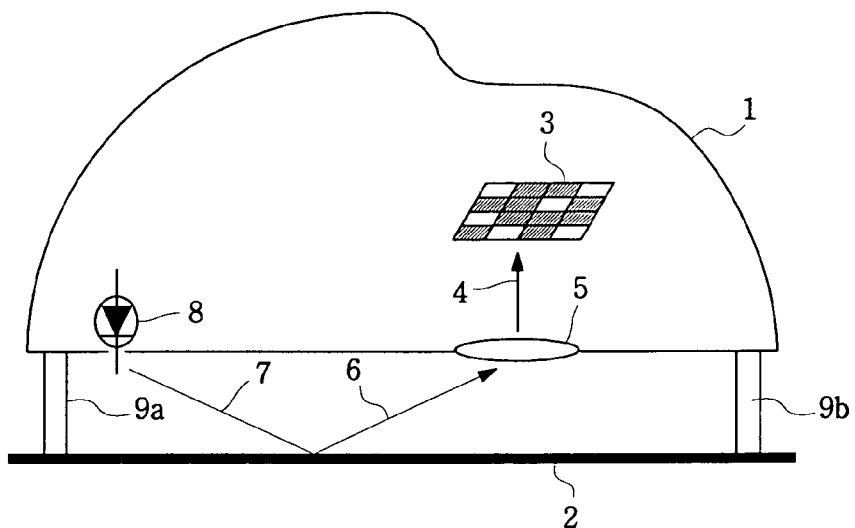
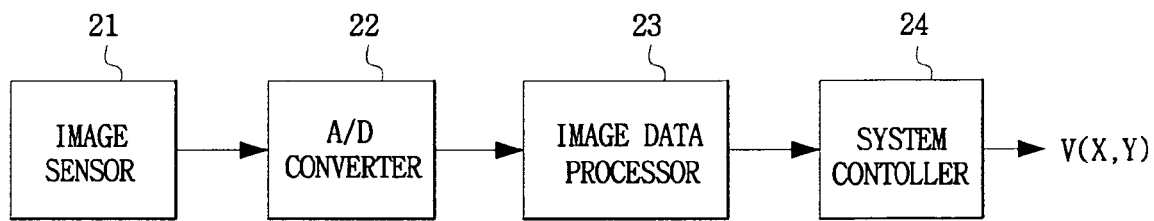

OPTICAL MOUSE AND METHOD FOR PREVENTING AN ERRONEOUS OPERATION THEREOF

This U.S. nonprovisional patent application claims priority under 35 U.S.C. § 119 of Korean Patent Application 2002-45093 filed on Jul. 30, 2002, the entire contents of which are hereby incorporated by reference.

BACKGROUND OF THE INVENTION

1. Field of the Invention

The present invention relates to an optical mouse and, more particularly to an optical mouse capable of preventing an erroneous moving value of the optical mouse from outputting, when the optical mouse is spaced apart from the surface.

2. Description of the Related Art

Generally, in case of an optical mouse, as shown in FIG. 1, a light 7 emitted from a light source 8 is reflected by an operating surface 2, and the reflected light 6 passes through a lens 5 to be inputted to an image sensor 3 made of semiconductor process. The optical mouse 1 measures a quantity of the light projected to the image sensor 3 and stores a pattern made by comparing a difference between pixels of the image sensor 3. Then, a movement of the mouse is calculated by comparing a current pattern with a pattern made in a prior sample period. FIG. 2 is a block diagram of a prior integrated circuit for calculating a moving value of an optical mouse. Referring to the integrated circuit comprises an image sensor 21, consisted of hundreds of pixels, for outputting signals accumulated for a given time as a pixel unit, an A/D converter 22 for receiving the output of the image sensor 21 and converting the output into a digital signal, an image data processor 23 for receiving and calculating the output of the A/D converter 22 and calculating a moving value V(X,Y) of the optical mouse, and a system controller 24 for controlling a timing with an external system, and receiving and outputting the output of the image data processor 23.

A bottom surface of the optical mouse 1 should be in contact with the operating surface to ensure that a focus of an image on the operating surface is precisely made on the image sensor 3. If the bottom surface of the optical mouse 1 is spaced apart from the operating surface 2, when the entered light passes through the lens 5 to be input to the image sensor 3, the image is out of focused and thereby prevent the optical mouse 1 from calculating the precise movement. Therefore, the image reflected at the image sensor 3 looks like moving. However, since there is no actual horizontal movement of the optical mouse, a cursor appeared in the computer monitor should stop moving.

In case of a prior ball mouse, there is no problem as mentioned above since a ball of the mouse is not moved. However, in case of the optical mouse, the optical mouse calculates the erroneous moving value since the moving value of the mouse is calculated by depending upon a quantity of the entered light, when the optical mouse is spaced apart from the operating surface.

SUMMARY OF THE INVENTION

An object of the present invention is to provide an optical mouse capable of preventing an erroneous moving value resulted from an operation of the optical mouse itself from outputting, when the optical mouse is spaced apart from an operating surface.

An optical mouse in accordance with the present invention is characterized in that the optical mouse comprises an image sensor, consisted of a plurality of pixels, for outputting signals accumulated in a given time as a pixel unit; an A/D converter for receiving the output of the image sensor and converting the output into a digital signal format; an image data processor for receiving the output of the A/D converter and calculating a moving value of the optical mouse; a system controller for controlling a data flow with an external system, and receiving and outputting the output of the image data processor; an average value calculator for receiving the output of the A/D converter and calculating an average value; and a pick-up state discriminator for receiving the output of the average value calculator and generating a pick-up state signal. The pick-up state signal is used to make the moving value "0". The optical mouse in accordance with the present invention is characterized in that the optical mouse further comprises a fluorescent lamp state discriminator for receiving the pick-up state signal from the pick-up state discriminator, discriminating whether the optical mouse is in a fluorescent lamp state and generating a fluorescent lamp state signal, and using the fluorescent lamp state signal to make the moving value "0".

A method for preventing an erroneous operation of an optical mouse in accordance with the present invention is characterized in that the method comprises a first step of judging whether a pixel average value in one sample period is below the reference level continuously; a second step of returning to a normal operating state when the pixel average value is not below the reference level continuously, and generating a pick-up state signal to make a moving value below the reference level when the pixel average value is below the reference level continuously; a third step of judging whether the pixel average value in one sample period is entered with a value not below the reference level continuously; a fourth step of returning to the third step when the pixel average value in one sample period is not entered with a value not below the reference level continuously, and judging whether a variation of the pixel average value is corresponded to a "fluorescent lamp state" when a value not below the reference level is entered continuously; and a fifth step of returning to the second step when a result of judgment of the "fluorescent lamp state" of the fourth step is the "fluorescent lamp state", and returning to the normal operating state when the judgment is not the "fluorescent lamp state".

BRIEF DESCRIPTION OF THE DRAWINGS

The above and other objects, features and advantages of the present invention will be more clearly understood from the following detailed description taken in conjunction with the accompanying drawings, in which:

FIG. 1 is a view illustrating a conventional optical mouse;

FIG. 2 is a block diagram of a prior integrated circuit for calculating a moving value of an optical mouse;

DETAILED DESCRIPTION OF THE PREFERRED EMBODIMENT

Hereinafter, the detailed description of an optical mouse in accordance with the present invention will be described in connection with the accompanying drawings.

Figure 3:
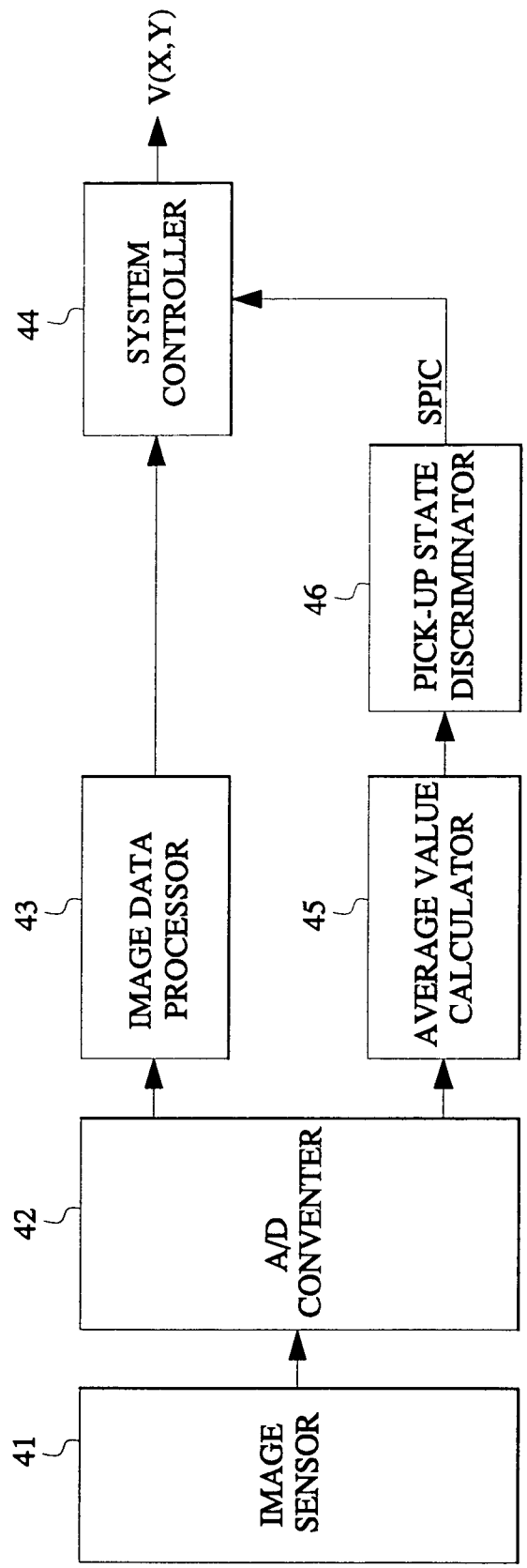
FIG. 3 is a block diagram of an integrated circuit in accordance with a first embodiment of the present invention for calculating a moving value of an optical mouse.

FIG. 3 is a block diagram of an integrated circuit in accordance with a first embodiment of the present invention for calculating a moving value of an optical mouse, wherein the optical mouse comprises an image sensor 41, consisted of hundreds of pixels, for outputting signals accumulated in a given time as a pixel unit; an A/D converter 42 for receiving the output of the image sensor 41 and converting the output into a digital signal format; an image data processor 43 for receiving and operating the output of the A/D converter 42 and calculating a moving value V(X,Y) of the optical mouse; an average value calculator 45 for receiving the output of the A/D converter 42 and calculating an average value; a pick-up state discriminator 46 for receiving the output of the average value calculator 45 and generating a pick-up state signal SPIC; and a system controller 44 for controlling a timing with an external system, and receiving and outputting the output of the image data processor 43, and making the moving value "0" under the control of the pick-up state signal SPIC.

Hereinafter, an operation of the optical mouse in accordance with a first embodiment of the present invention shown in FIG. 3 will be explained.

The optical mouse accomplishes samplings of surface images with more than 1500 times per second. A light reflected by the surface in one sampling period is projected to the image sensor, and a current location of the optical mouse is calculated by using the projected value. The image sensor 41 captures an image on the surface to output the image, and the A/D converter 42 receives the output of the image sensor 41 to convert the output into a digital signal format. The image data processor 43 receives the output of the A/D converter 42 to compare a difference between pixels to make a pattern, and compares with a pattern made in a prior sample period to calculate the moving value V(X,Y) of the optical mouse.

When the optical mouse is spaced apart from the operating pad surface, a quantity of light reflected by the surface and entered into the image sensor 41 is significantly reduced. Therefore, a quantity of pixel outputs inputted into the A/D converter 42 becomes smaller, and pixel values converted to digital signals become below the reference level for the most part. In this case, the average value calculator 45 adds all pixel values in one sampling period and obtain an average value of below the reference level. The pick-up state discriminator 46 judges whether the optical mouse is spaced apart from the operating surface when an average value of pixels in one sampling period becomes below the reference level continuously, and generates the pick-up state signal SPIC. In the pick-up state, the optical mouse controls as if the optical mouse is not moving by sending a value V(X, Y)="0" rather than sending a value calculated therein as a moving value.

While a user picks up the optical mouse from the surface, moves it above the surface and puts it on the surface, this invention prevents the optical mouse from outputting movement signals. When the optical mouse is moved again after the location on the surface, a pixel average value in one sample period has a value not below the reference level. In this case, the optical mouse accomplishes a normal operation by escaping the pick-up state, and transmits the moving value V(X,Y) calculated in the image data processor 43 to an external system. As described hereinabove, as the average value for all pixels in the one sampling period is calculated, the optical mouse may discriminate whether the optical mouse is spaced apart from the operating surface. When the optical mouse is moved with spacing apart from the surface, the optical mouse detects the pick-up state to control the moving value V(X,Y), representing a moving of the optical mouse, as a value of below the reference level. Therefore, in the pick-up state, the cursor appeared in the monitor (not shown) by the moving value outputted by the optical mouse is not moved.

Figure 4:
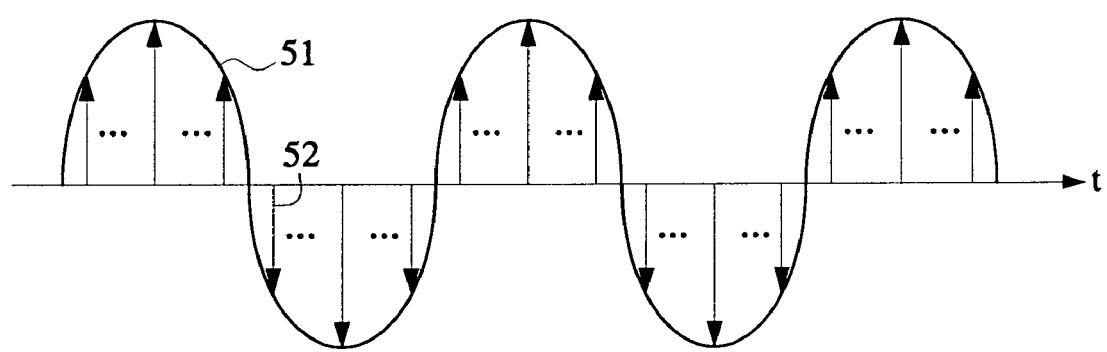
FIG. 4 is a view illustrating a relationship between a wave shape of a light of a fluorescent lamp and a sampling frequency.

In case of the pick-up state, an external light (for example, a fluorescent lamp or an incandescent lamp) except the light emitted from a light source of the optical mouse may be entered through the lens to the optical mouse. In case of the incandescent lamp, since a light is entered always evenly, the optical mouse is moved with a directional tendency depending upon a location of the incandescent lamp and a direction of the lens. When the light quantity of the incandescent lamp entered to the optical mouse is increased, the pixel average value in one sample period comes to have a value of not below the reference level. Therefore, the optical mouse calculates the moving value depending upon a moving of direction of the optical mouse with reference to the location of the incandescent lamp. As a result, the optical mouse is escaped from the pick-up state. In this case, the pixel average value in one sample period does not vary often. However, the fluorescent lamp has flickers of 60 times per second. Therefore, the optical mouse, accomplishing samplings more than 1500 times per second, can detect a variation of the light quantity generated by the flickers. FIG. 4 is a view illustrating a relationship between a wave shape of a light of a fluorescent lamp and a sampling frequency of the optical mouse. As shown in FIG. 4, when the fluorescent lamp has a sine wave 51 having a cycle of 60 times per second, the optical mouse receives different light quantities at every sampling period 52 of 1500 times per second, and an erroneous operation may be occurred by the light quantity varied at every sample period. Therefore, in the pick-up state, when the optical mouse is exposed to the fluorescent lamp, the optical mouse moves by itself without a directional tendency. Thus, this moving provides a feeling of the erroneous operation to the user. In this case, it is required not to move the cursor on the monitor by making the moving value to V(X,Y)="0".

Figure 5:
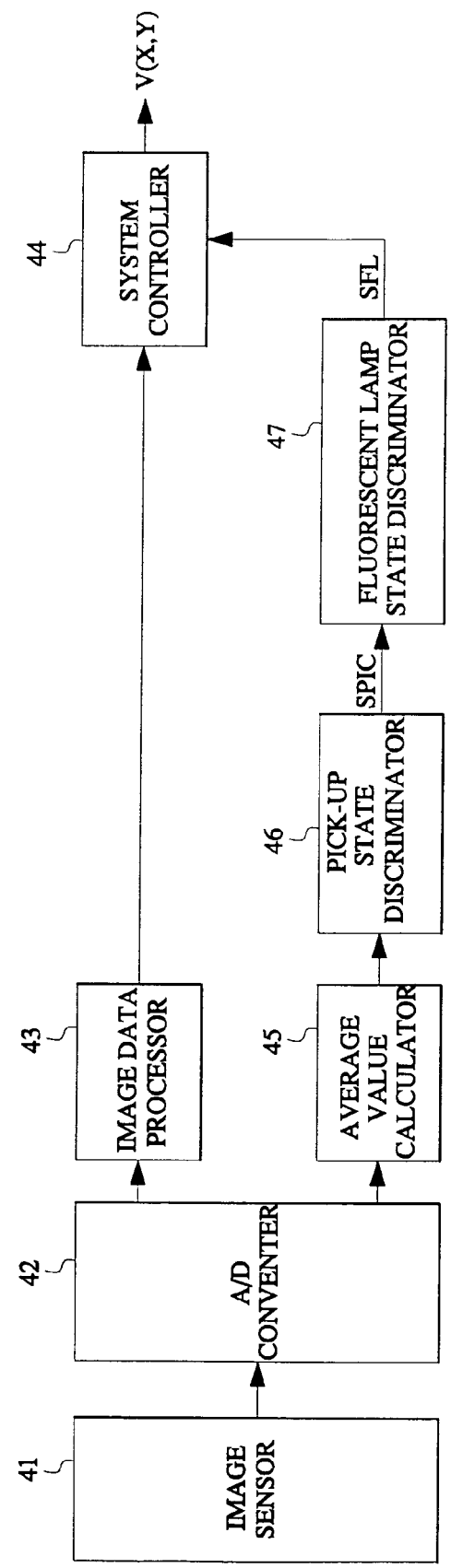
FIG. 5 is a block diagram of an integrated circuit in accordance with a second embodiment of the present invention for calculating a moving value of an optical mouse.

FIG. 5 is a block diagram of an integrated circuit in accordance with a second embodiment of the present invention for calculating a moving value of an optical mouse, further comprising a fluorescent lamp state discriminator 47 in addition to FIG. 4.

The integrated circuit shown in FIG. 5 comprises an image sensor 41, consisted of hundreds of pixels, for outputting signals accumulated in a given time as a pixel unit; an A/D converter 42 for receiving the output of the image sensor 41 and converting the output into a digital signal format; an image data processor 43 for receiving and operating the output of the A/D converter 42 and calculating a moving value V(X,Y) of the optical mouse; a system controller 44 for controlling a timing with an external system, and receiving the output of the image data processor 43; an average value calculator 45 for receiving the output of the A/D converter 42 and calculating an average value; a pick-up state discriminator 46 for receiving the output of the average value calculator 45 and generating a pick-up state signal SPIC; and a fluorescent lamp state discriminator 47 for receiving the pick-up state signal SPIC, judging whether the optical mouse is in the fluorescent lamp state, and generating a fluorescent lamp state signal SFL. The moving value V(X,Y) becomes "0" when the fluorescent lamp state signal SFL is active.

Hereinafter, an operation of the optical mouse in accordance with the second embodiment of the present invention shown in FIG. 5 will be explained. Here, the detailed description of the fluorescent lamp state discriminator will be explained in focus.

The output of the image sensor 41 by a light source having a regular cycle varies depending upon a regular cycle by the pixel average value at respective samplings. The present invention designates the state of periodically detected variation as the "fluorescent lamp state". When the optical mouse is normally operated on the surface, there is no "fluorescent lamp state" since the light source of the optical mouse is relatively strong. Therefore, it is to be supposed that the "fluorescent lamp state" is generated only when the optical mouse is picked up from the operating surface. As described hereinabove, the pick-up state discriminator 46 generates the pick-up state signal SPIC representing whether the optical mouse is spaced apart from the operating surface. The fluorescent lamp state discriminator 47 receives the pick-up state signal SPIC, and discriminates whether the optical mouse is in the fluorescent lamp state to generate the fluorescent lamp state signal SFL. After the optical mouse is entered into the pick-up state, when the "fluorescent lamp state" is detected, the optical mouse keeps the pick-up state continuously.

The second embodiment of the present invention further comprises the fluorescent lamp state discriminator 47 for detecting the fluorescent lamp state when the optical mouse is escaped from the pick-up state in order to prevent the cursor on the monitor from an erroneous operation by a fluorescent lamp when the optical mouse is picked up and moved.

Figure 6:
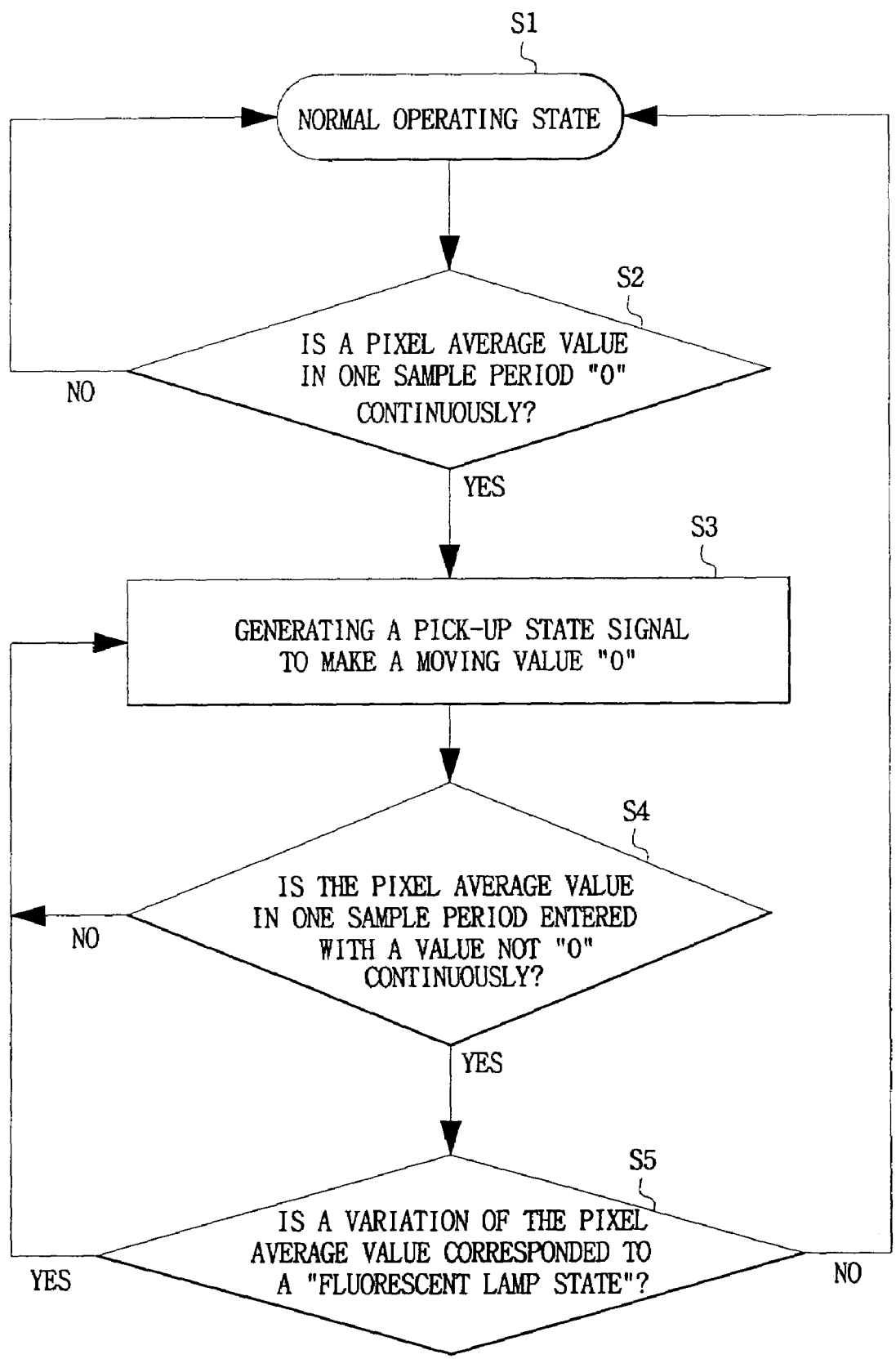
FIG. 6 is a flow chart illustrating a method for finding a moving value when an optical mouse in accordance with the present invention is spaced apart from an operating surface.

FIG. 6 is a flow chart illustrating a method for finding a moving value when the optical mouse in accordance with the present invention is spaced to apart from the operating surface. First, in the normal operating state S1, judging S2 whether the pixel average value in one sample period is below the reference level continuously. When the pixel average value is not below the reference level, returning to the normal operating state S1 is taken. When the pixel average value is below the reference level, the pick-up state signal is generated S3. Next, judging S4 whether the pixel average value in one sample period is entered with a value not below the reference level continuously. When the value not below the reference level is not entered continuously, returning to the step S3 is taken. When the value not below the reference level is entered continuously, judging S5 whether the variation of the pixel average value is corresponded to the "fluorescent lamp state". When the variation is not corresponded to the "fluorescent lamp state", returning to the step S1 is taken. When the variation is corresponded to the "fluorescent lamp state", returning to the step S3 to generate the pick-up state signal to make the moving value below the reference level.

As described hereinabove, the optical mouse in accordance with the present invention is capable of preventing the erroneous moving value from outputting by an operation of the optical mouse itself when the optical mouse is spaced apart from the surface, and preventing the erroneous operation by the light source of the fluorescent lamp. In addition, using the image sensor of the present invention, an input device having a pen shape is capable of judging whether information is effective by detecting whether a pen is spaced apart from a surface of a writing window.

While this invention has been described in connection with what is presently considered to be the most practical and preferred embodiment, it is to be understood that the invention is not limited to the disclosed embodiment, but on the contrary, it is intended to cover various modifications within the spirit and the scope of the appended claims.

What is claimed is:

1. An optical mouse comprising;
   an image sensor, consisted of a plurality of pixels, for outputting signals accumulated in a given time as a pixel unit;
   an A/D convener for receiving the output of the image sensor and converting the output into a digital signal format;
   an image data processor for receiving the output of the A/D converter and calculating a moving value of the optical mouse;
   a system controller for controlling data flow with an external system and receiving the image data processor;
   an statistic value calculator for receiving the output of the A/D converter and calculating an statistic value; and
   a pick-up stats discriminator for receiving the output of the stastic value calculator and generating a pick-up state signal,
   wherein the pick-up state signal is used to make the moving value "0".

2. The optical mouse according to claim 1, wherein the statistic value is obtained by averaging the pixel value.

3. The optical mouse according to claim 1, further comprising a fluorescent lamp state discriminator for receiving the pick-up state signal from the pick-up state discriminator, discriminating whether the optical mouse is in a fluorescent lamp state and generating a fluorescent lamp state signal, and controlling the moving value.

4. A meted for preventing en erroneous operation of an optical mouse comprising:
   a first step of judging whether a pixel statistic value in one sample period is below the reference level continuously;
   a second step of returning to a normal operating state when the pixel statistic value is not below the reference level continuously, and generating a pick-up state signal to make no moving state when the pixel statistic value is below the reference level continuously;
   a third step of judging whether the pixel statistic value in one sample period is entered with a value not below the reference level continuously;
   a fourth step of returning to the third step when the pixel statistic value in one sample period is not entered with a value not below the reference level continuously, and judging whether a variation of the pixel statistic value is corresponded to a fluorescent lamp state when a value not below the reference level is entered continuously; and
   a fifth step of returning to the second step when a result of judgment of the fluorescent lamp state of the fourth step is the fluorescent lamp state, and returning to the normal operating state when the judgment is not the "fluorescent lamp state".

5. The method for preventing an erroneous operation of an optical mouse according to claim 4, wherein the statistic value is obtained by averaging the pixel value.

* * * * *

UNITED STATES PATENT AND TRADEMARK OFFICE
CERTIFICATE OF CORRECTION

PATENT NO. : 7,088,338 B2  Page 1 of 1
APPLICATION NO. : 10/628983
DATED : August 8, 2006
INVENTOR(S) : Jung Hong Ahn It is certified that error appears in the above-identified patent and that said Letters Patent is hereby corrected as shown below:

Column 6,
Line 22, before "statistic", delete "an" and insert therefor --a--.
Line 24, after "pick-up", delete "stats" and insert therefor --state--.
Line 25, after "output of the ", delete "stastic" and insert therefor --statistic--.
Line 37, after "A", delete "meted" and insert therefor --method--.
Line 37, after "preventing", delete "en" and insert therefor --an--.

Signed and Sealed this

Twentieth Day of February, 2007

JON W. DUDAS
*Director of the United States Patent and Trademark Office*